Aug. 23, 1938. W. H. FULTON 2,127,510
MEANS FOR SPIKING TURF
Filed Sept. 19, 1935  4 Sheets-Sheet 1

W. H. Fulton INVENTOR.
BY Thomas Howe
ATTORNEY.

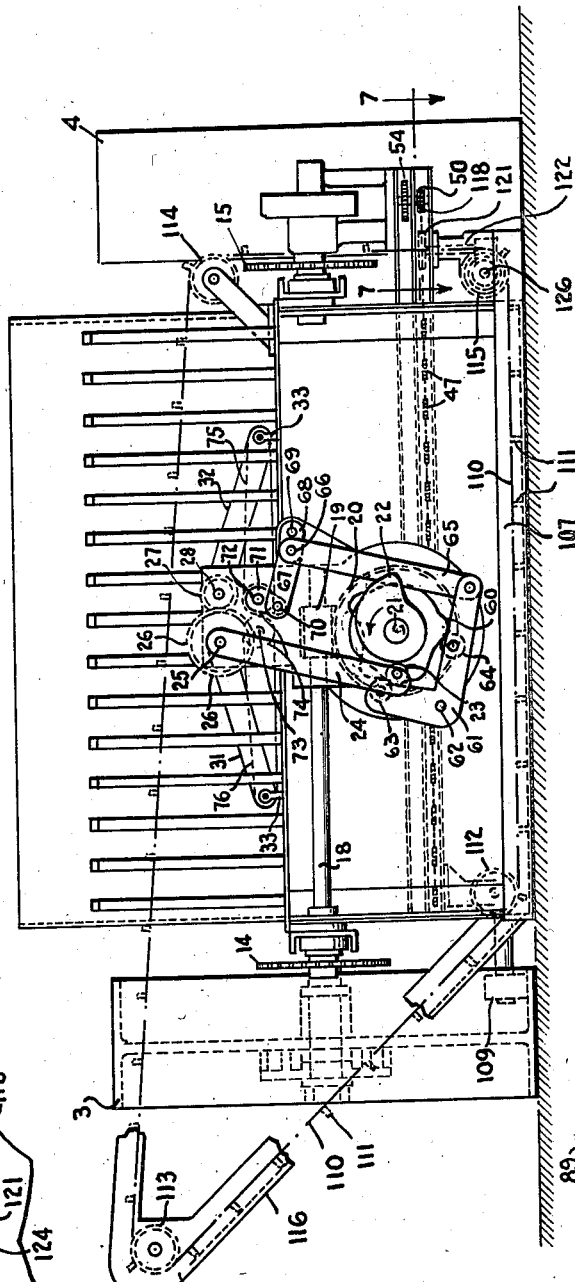

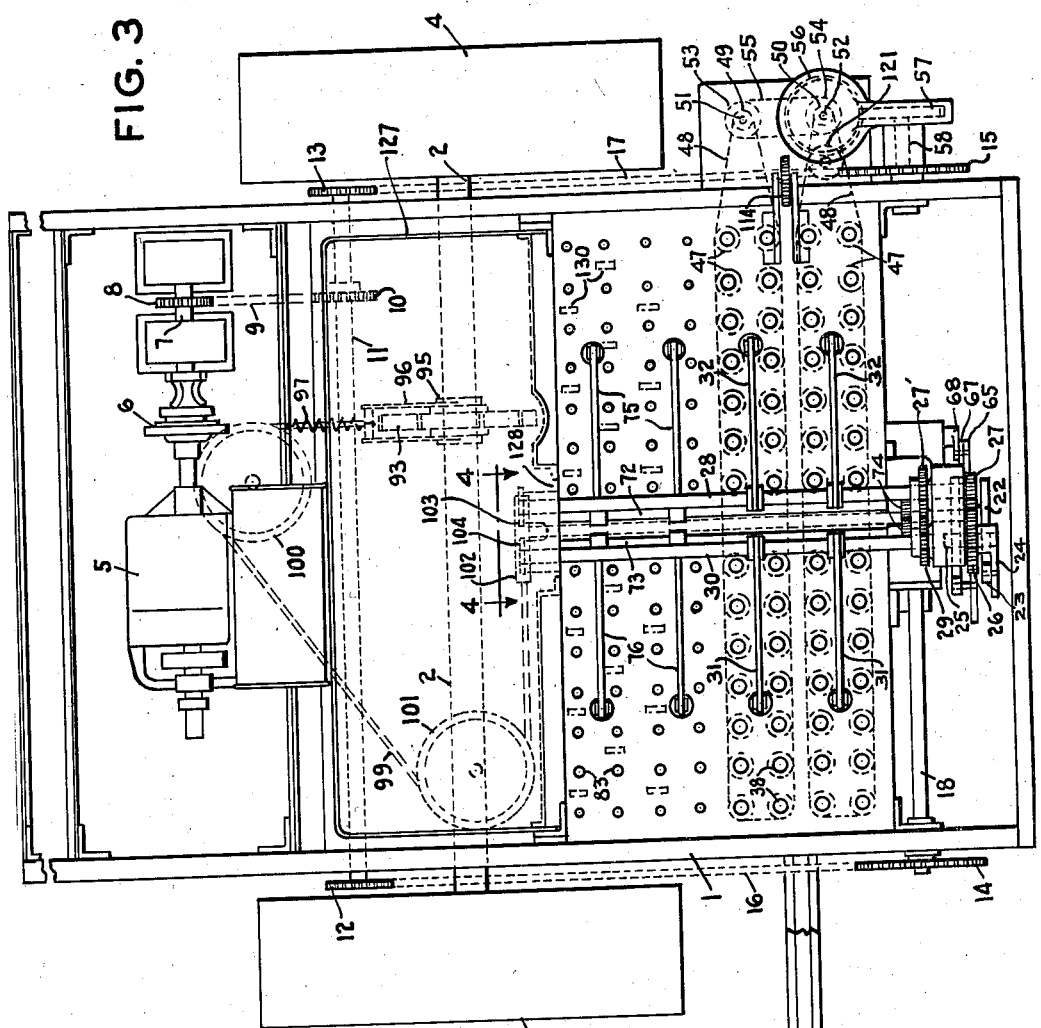

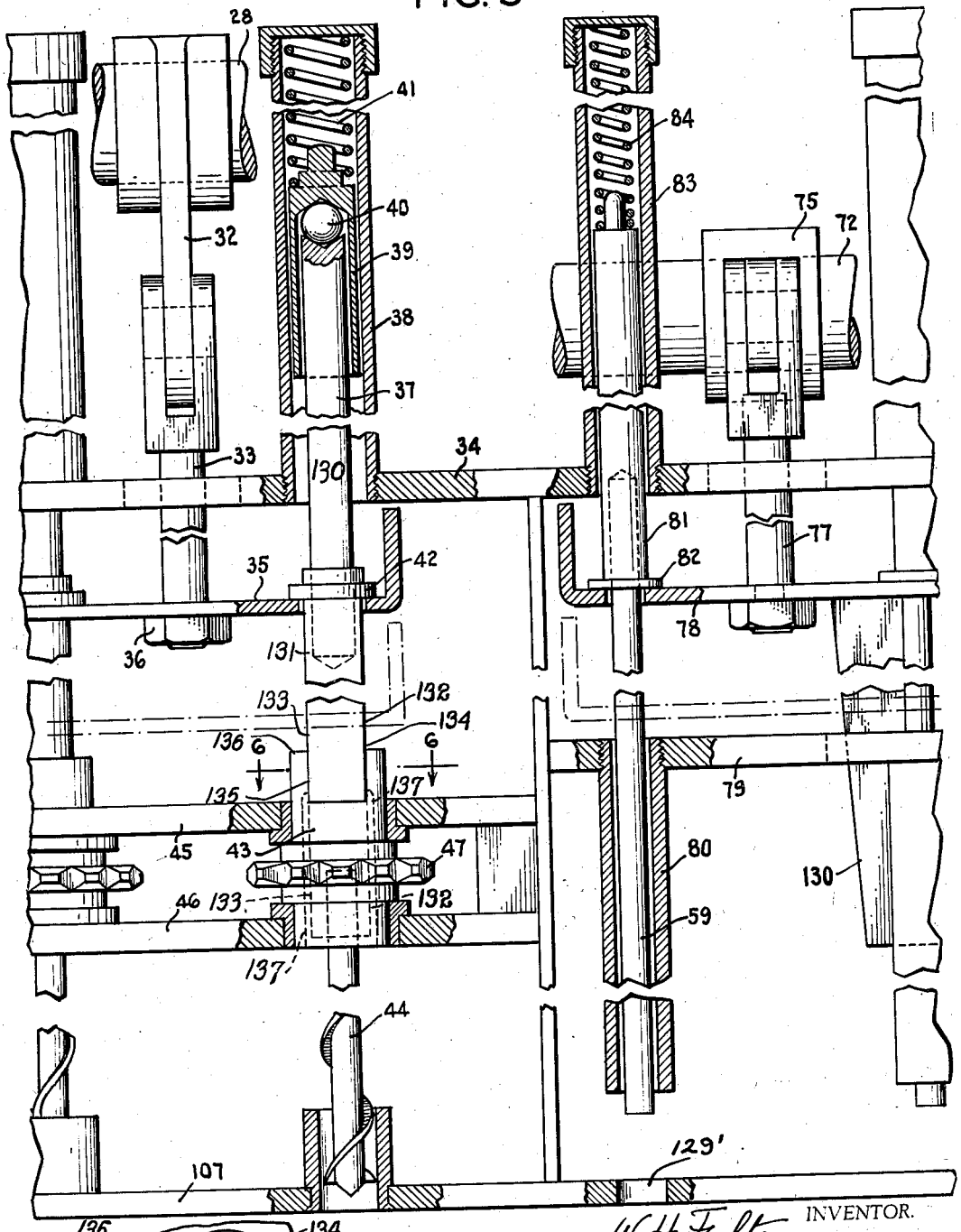

Patented Aug. 23, 1938

2,127,510

UNITED STATES PATENT OFFICE 2,127,510

MEANS FOR SPIKING TURF

William H. Fulton, West Orange, N. J.

Application September 19, 1935, Serial No. 41,231

18 Claims. (Cl. 111—89)

This invention relates to methods and means for what is known as "spiking" turf. Some turf or other ground areas, as for instance the greens in golf courses, cannot be spaded, ploughed or otherwise tilled causing corresponding gradual deterioration of the grass. It has been proposed to relieve against this condition, and as a sort of substitute for tilling, that small holes be formed in the turf to a depth of several inches and suitably distributed over the area affected. These holes may be left open when they will provide space into which the surrounding earth may work thereby slightly agitating and lightening the soil, and also rain or surface water of any character may enter the holes and thereby penetrate the soil, the moisture thus reaching a position where it can efficiently operate upon the grass roots. These holes might also be filled with sand which would gradually work into and lighten the surrounding soil, or fertilizer might be introduced into the holes and would thereby be brought into the most efficient relation to the grass roots beneath the soil. Such operation of forming holes in the turf is commonly known as "spiking".

It will be observed that this formation of a number of holes distributed over the turf, such as a golf green, will not interfere with the use of the green for playing purposes, but will, so far as the condition and up-keep of the greens is concerned, be a satisfactory substitute for the usual tilling operations.

It is necessary, however, that in "spiking", the operation should be carried out in such manner as not to tear the turf as otherwise in cases requiring levelness and smoothness, such as golf greens, the disturbing of the turf would seriously impair if not destroy the usefulness of the area treated.

The main object of the present invention is to provide improved means of the character indicated which shall perform the "spiking" with ease, efficiency and speed.

A further object of the invention is to provide improved means of the character as indicated which shall not injure the turf.

A further object of the invention is to provide improved means of the character as indicated, the use of which is simple and not laborious to the operator.

A further object of the invention is to provide means for accurately and efficiently filling material into the excavated holes.

A further object of the invention is to provide such filling means in combination with the hole forming means.

A further object of the invention is to provide improved means for tamping the material filled in the holes.

A further object of the invention is to provide such tamping means in combination with hole forming means.

A further object of the invention is to provide a combination of hole making, filling and tamping means.

A further object of the invention is to provide improved means for causing a dwell in the lateral movement of the vehicle carried excavators during which they are inserted into and withdrawn from the ground.

Other and ancillary objects of the invention will appear hereinafter.

In the accompanying drawings which illustrate the invention—

Fig. 2 is a front end elevation of the apparatus of Fig. 1;

Fig. 3 is a top plan view of the apparatus of Figs. 1 and 2;

Fig. 4 is a fragmentary view, on an enlarged scale, on the line 4—4 of Fig. 3;

Fig. 5 is an enlarged view, partly in elevation, partly in section and partly broken away, showing the excavators and tampers;

Fig. 6 is a section on the line 6—6 of Fig. 5;

Fig. 7 is a fragmentary view, on an enlarged scale, on the line 7—7 of Fig. 2; and Fig. 8 is a front elevation, on an enlarged scale, of the cam for operating the tampers.

Figure 1:
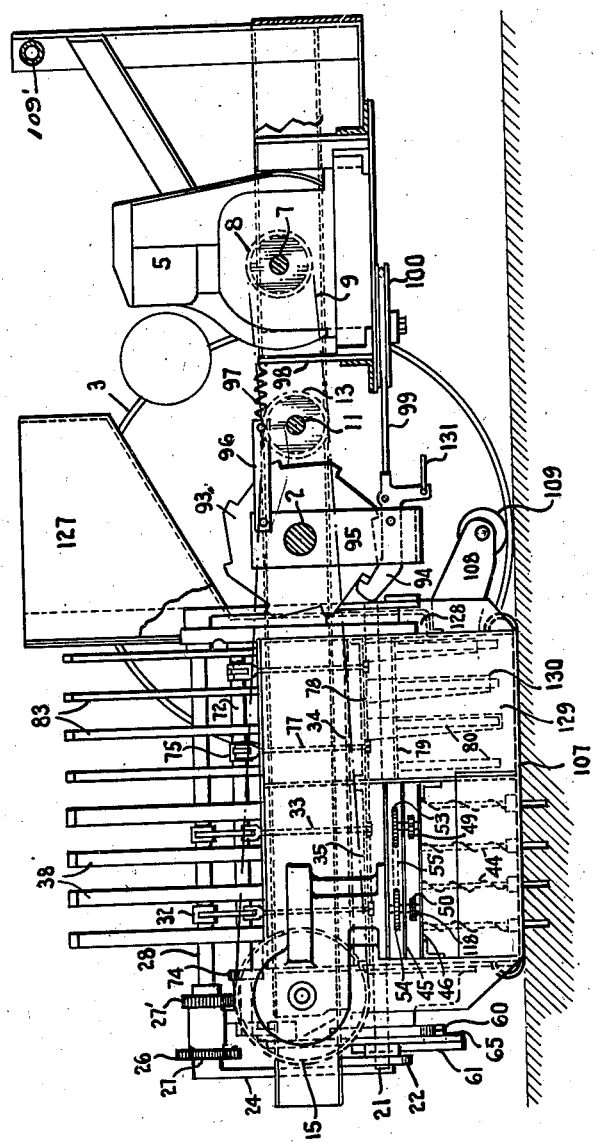
Fig. 1 is a side elevation of apparatus embodying the invention.

Referring to the drawings, the apparatus comprises a vehicle upon which are mounted a plurality of drills or augers adapted to be inserted into and removed from the earth to form holes therein, tampers for material, such as fertilizer, fed into the holes formed by the drills, a reservoir for such material, agitators to aid the flow of the material into the holes and means for propelling the vehicle by intermittent motion whereby the drills and tampers will be laterally stationary with relation to the ground while they are inserted therein and the holes will be properly distributed over the area treated and the tampers will properly register with the holes.

Referring now to the drawings more in detail, the apparatus comprises a frame 1 supported upon the axle 2 to which are secured the traction wheels 3 and 4. The axle and its connected traction wheels are driven in an intermittent motion by a suitable motor such as a gasolene internal combustion engine 5. The shaft of the motor 5 is connected by means of a releasable clutch 6 with a shaft 7 rotatably mounted on the frame and having fixed thereon a sprocket wheel 8. The clutch 6 affords a means for connecting and disconnecting the motor from the shaft 7.

The sprocket wheel 8 is connected by a sprocket chain 9 with a sprocket wheel 10 fixed upon a shaft 11 rotatably mounted in the frame and having fixed upon its ends the sprocket wheels 12 and 13 respectively connected with the sprocket wheels 14 and 15 by the sprocket chains 16 and 17.

The sprocket wheel 14 is fixed upon the shaft 18 rotatably mounted in the frame, there also being fixed upon the shaft a worm 19 in operative relation to a worm wheel 20 fixed upon the shaft 21 rotatably mounted in the frame. From this shaft 21 is operated the plate 35 which, in its raised position, holds the drills elevated against the pressure of the springs 41 which tend to force them into the earth. Also operated from this shaft is the plate 78 which in its raised position holds the tampers, for tamping fertilizer or other material into the holes formed in the earth by the drills, elevated against the pressure of springs 84 tending to force them toward the earth and into the holes. By the plate 78 are also operated the agitators for the filling material, which are carried thereby. Also the vehicle is propelled from this shaft 21.

The plate 35 for raising the drills is operated from a cam 22 fixed upon the shaft 21 and upon the periphery of which runs a roller 23 pivoted in the arm 24 which is fixed on a shaft 25 rotatably mounted on the frame and which also has fixed to it the gear 26 meshing with a smaller gear 27 to amplify the movement. The gear 27 is fixed on the end of shaft 28 rotatably mounted in the frame and also on the shaft 28 is fixed the gear 27' meshing with a gear 29 of the same size fixed upon the rotatably mounted shaft 30.

As the cam 22 rotates it will move the arm 24 thereby rocking the shaft 25 and gear 26, this rocking movement being amplified and transmitted to the shaft 28 by gear 27 and the shafts 28 and 30 are equally rocked by reason of the gears 27' and 29.

To the rock shaft 30 are fixed arms 31 and similar arms 32 are fixed to the rock shaft 28 so that the arms are raised and lowered as the shafts are rocked. Pivoted to the ends of the arms respectively are links 33 (see Fig. 5) passing through openings in the plate 34 fixed to the frame and also through openings in the vertically movable plate 35, there being nuts 36 on the ends of the links such that they will not pass through the openings in the plate which rises and falls therewith. Also passing through the plates are the drill plungers 37 each of which passes through the plate 34 into a tubular housing 38 mounted in the plate 34. The upper portion of the plunger is telescoped loosely in a sleeve 39 and a ball 40 interposed between the ends of the sleeve and the end of the plunger whereby a universal connection permitting relative adjustment and rotation of the parts is provided. A compression spring 41 interposed between the end of the sleeve and the top of the housing 38 tends to force the plunger downwardly. Fixed on the plunger just above the plate 35 is a collar or shoulder 42 overlapping the edges of the hole in the plate, so that the plunger will be lifted with the plate.

The plunger slides longitudinally within a hub 43, the plunger and the hub having flat surfaces in engagement as shown in Fig. 6 to prevent relative turning. Fixed in the lower end of the plunger is the shank of the drill 44. The hub 43 is rotatably mounted in the plates 45 and 46 which are fixed to the frame, and fixed upon the hub 43 is a sprocket wheel 47 by which the drill is rotated.

The plunger 37 comprises the upper cylindrical portion 130 which is fixed in the lower portion 131 of larger diameter than the portion 130 and having its sides 132 and 133 flattened. The flattened sides 132 and 133 bear against the flat sides 134 and 135 in the top portion 136 of the hub 43. Below the flat sides 134 and 135 on the hub, the hub has a bore 137. The shank of the drill 44 is fixed in the lower end of the plunger portion 131.

The drills (see Fig. 3) are arranged in four rows transversely of the machine and are divided into two groups of two rows each, the drill sprockets 47 of each group being surrounded by sprocket chain loops 48 each of which engages with all the drill sprockets of the group to turn the drills in the same direction, these sprocket loops passing about and engaging with the sprocket wheels 49 and 50 fixed respectively upon the shafts 51 and 52 which are rotatably mounted in the plates 45 and 46. The sprocket wheels 49 and 50 are connected in driving relation by the sprockets 53 and 54 fixed to the shafts 51 and 52 and connected by a sprocket chain 55.

The drive for rotating the drills is effected by the skew-gear 56 fixed upon the shaft 52, which skew-gear is in co-operating relation with a matting skew-gear 57 fixed upon a shaft 58 rotatably mounted in the frame. Also fixed upon the shaft 58 is the sprocket wheel 15 which is driven by the sprocket chain 17 connected in driving relation to the motor 5 as above set forth.

The tamping rods 59, which will register with the holes previously formed by the drills, are driven from the complementary cam 60—60' fixed on the shaft 21, by means of a bell crank lever 61 pivoted to a stationary part of the apparatus at 62. Pivoted upon the lever 61 are rotatably mounted rollers 63 and 64, one in the plane of the cam disk 60 and the other in the plane of the cam disk 60'.

The complementary cam referred to, as is common with such cams, comprises the complementary discs 60 and 60' fixed on the shaft 21 closely alongside each other, each raised portion on disc 60 on which runs the roller 64 having a corresponding or complementary depression on the disc 60' on which the roller 63 runs whereby the rollers 63 and 64 may follow the contours of their respective cam discs and are at all times maintained in contact therewith so that the bell crank 61 is always held definitely in position.

It will be observed that there are a series of raised portions with intervening depressions on the cam 60 so that as the shaft 21 turns, the lever 61 will be oscillated.

As the arm 61 is oscillated by the cam 60, the link 65 will be longitudinally oscillated. Such link is pivoted at one end to the lever 61 and its other end to the pivotal point 66 whereat are pivoted together the toggle links 67 and 68. The other end of the toggle link 68 is pivoted to a stationary member 69 while the other extremity of the link 67 is pivoted at 70 to a crank arm 71 fixed to a shaft 72 rotatably mounted in the frame. It will thus be seen that as the cam 60—60' rotates the shaft will be rocked. As the roller 63 rides over each rise of its cam disc, the shaft 72 will be twice rocked for the reason that the pivotal point 66 of the link 65 passes the center line of the toggle, first in one direction and then in the other, the shaft 72 being rocked for each stroke of the link 65.

Also rotatably mounted in the frame is a shaft 73, the two shafts 72 and 73 being connected in driving relation by two equal sized gears 74 so that as the shaft 72 is rocked the shaft 73 will be rocked in like manner.

Fixed upon the shaft 72 is a pair of arms 75 and a similar pair of arms 76 is fixed upon the shaft 73. It will now be seen that as the shafts 72 and 73 are rocked the free ends of the arms 75 and 76 will be raised and lowered. Each one of the arms 75 and 76 (see Fig. 5) has pivoted to its end a link 77 which passes through the plate 34 and also through the tamper operating plate 78, a nut being provided at the lower end of the link 77 beneath the plate 78 so that the plate is secured thereto.

Fixed in the stationary plate 79 fixed to the frame are the tubular guides 80 for the tamping rods 59 respectively. Each of the tamping rods is secured to a plunger 81 which has a collar 82 above which the plate 78 cannot pass, and each telescopes loosely within a housing 83 fixed in the plate 34, a compression spring 84 being interposed between the plunger and the end of the housing 83 which forces the tamping rod downwardly when the plate 78 is lowered. The springs 84 permit the stroke of the tamping rods 59 to be shortened as the hole fills with the fertilizer or other material so that the tampers 59 have a progressively decreasing stroke as the holes are filled. Also the springs serve to cushion the tamping rod should it encounter a stone or other obstruction.

As the cam disc 60 rotates, while the roller 64 is in contact with the concentric portion 85 the tamping rod operating arms will not be moved but will remain in their elevated position and the tamping rods 59 will accordingly remain in their elevated positions. When however the roller 64 rides upon a rise of the cam the bell-crank 61 will be rocked and the tamping rods correspondingly lowered. When the roller 64 descends from the rise of the cam the tamping rods will be correspondingly raised. This movement is permitted and the bell crank 61 held definitely in position by the roller 63 engaging rises and depressions on the cam disc 60' which are complementary to the depressions and rises respectively upon the cam disc 60 as is well understood in connection with complementary cams.

The vehicle is propelled by means of a ratchet wheel 93 fixed upon the shaft 2 and moved by a dog 94 pivoted in the yoke 95 which is turnably mounted on the shaft 2. A link 96 pivoted to the yoke 95 above the shaft 2 has a spring 97 extending from it to a bracket 98 upon the frame. This spring tends to move the dog 94 to the left as viewed in Fig. 1. A flexible cable 99 is secured at one end to the dog 94. When placed under tension this cable tends to move the dog and yoke 95 against the tension of the spring 97 so as to step up the wheel 93, and so turn the shaft 2 of the traction wheels and so propel the vehicle over the ground. Upon relaxation of the tension in the cable 99, the spring 97 will rotate the yoke 95 so as to move the dog 94 to the left (Fig. 1) and engage a new tooth upon the wheel 93 in readiness to turn that wheel another step upon tension again being applied to the cable 99.

The cable 99 passes about a guide pulley 100 rotatably mounted in the frame and also about another guide pulley 101 rotatably mounted in the frame to a link (see Fig. 4) 102 pivoted to the links 103 and 104 which are respectively pivotally mounted upon the shafts 28 and 30.

Upon one of the links 103 is rotatably mounted a roller 105 adapted to roll upon the surface of a cam 106 fixed upon the shaft 21. As the cam 106 is rotated with the shaft 21, the links 103 and 104 are deflected as the roller passes over the elevated portion of the cam thereby causing a pull on the cable 99 which results in the driving of the machine forward by a certain amount. As the roller 105 descends on to the concentric portion of the cam the spring 97 will restore the dog 94 into position for engaging the ratchet wheel 93 for another step forward of the vehicle, but no driving of the vehicle will take place until the roller 105 again ascends upon the raised portion of the cam when the vehicle will again be driven another step forward. In this manner the vehicle is intermittently driven forward a step at a time, the steps being separated by periods during which the vehicle is stationary. The motor 5 being continuously operating, the driving of the vehicle may be suspended by exerting a pull upon the cable 131 whereby the dog 94 will be turned on its pivot so that it will not engage the ratchet wheel 93. The propelling mechanism may, however, be again thrown into operation by releasing the tension upon the cable 131. The cable 131 may extend to a conveniently located handle lever (not shown).

It is to be observed that the drills and tampers pass through a plate 107 which slides along the ground or is closely adjacent thereto, the edges of the plate being turned upwardly as shown to facilitate the passage of the plate over the ground, and to further insure that the end of this plate shall not dig into the earth arms 108 (one on each side) are fixed thereto and project rearward thereof. In the rear end of each arm 108 is rotatably mounted a roller 109 which rollers bear upon the interior of the rims of the wheels 3 and 4. This provides a support for preventing the apparatus as a whole from swinging about the supporting shaft 2 and forcing the plate 107 downwardly which prevents it from digging into the ground, and the rollers 109 prevent undue friction between the support and the traction wheel rims.

The apparatus may be steered and also swing about the shaft 2 by means of a transverse handle bar 109' on the near end of the frame.

The dirt excavated by the drills will fall upon the plate 107, and in order to remove this dirt a conveyor travelling transversely of the apparatus and centrally of the drills is provided for removing the excavated dirt from the plate 107 and depositing it at one side of the machine. This conveyor comprises an endless sprocket chain 110 havng the flat paddles or scrapers 111 fixed thereto and scraping upon or running in close proximity to the plate 107. The sprocket chain passes about the sprocket wheels 112, 113, 114 and 115, the conveyor passing from proximity to the plate 107 through an upwardly and laterally inclined trough-like structure 116 within which the scrapers fit more or less closely so that the dirt scraped from the plate 107 is carried upwardly through the trough and discharged to one side through the opening 117. The dirt being thus removed from the central region of the drills, any dirt accumulating at each side will gradually gravitate down where it will be in position for removal by the central conveyor, and insufficient dirt will be accumulated at any time to be objectionable.

The conveyor is driven by means of a sprocket wheel 118 fixed on the shaft 52 connected in driving relation to a sprocket wheel 121 on a shaft 122 by means of a sprocket chain 123 (see Fig. 7). Also fixed upon the shaft 122 is a worm 124 in driving relation to a worm wheel 125 fixed upon the same shaft 126 as is the sprocket 115. It will thus be apparent that the driving power for the drills also operates to drive the sprocket chain 110 of the conveyor and to maintain it in operation as long as the drills are in operation.

Also mounted upon the vehicle is a storage hopper 127 for fertilizer, sand or other material to be inserted in the holes in the earth, such hopper communicating through a passage 128 with the compartment 129 in which the tampers are located and having holes 129' in the plate 107 forming its bottom.

In order to agitate the material in the tamping compartment and maintain it in a fluent condition so as to readily enter the holes in the earth, a series of agitators in that compartment may be provided and may take the form of projections 130 secured to the reciprocating plate 78 so as to be moved up and down therewith and thus agitate the material. The agitating projections have their lower ends at a shorter distance below the plate 78 and at a greater distance above the plate 107 so that the agitators do not reach the plate 107 when the tampers are operated to enter the holes in the earth.

The apparatus is so constructed and organized that in operation, it being assumed that the apparatus has just come to rest after a step forward over the ground, the tampers and drills being elevated out of the earth and the holes 129' in registry with the holes in the earth formed by the drills at the next previous dwell in the forward movement of the vehicle, the drills, during the ensuing dwell, will be forced inwardly into the earth and withdrawn therefrom and meanwhile the tampers will have been operated to tamp into the holes in the earth the filling material fed through the holes 129'. These operations having been completed and the drills and tampers withdrawn from the earth, while they are held elevated, the vehicle will be driven forward another step, thereby bringing the holes 129' into registry with the holes in the earth just previously formed, and during the following period of rest of the vehicle the next cycle of operations will be initiated by the operation of the drills and tampers, which will be inserted in the earth and withdrawn therefrom, after which the vehicle will be driven forward another step and thus the cycle of operations may be repeated indefinitely.

While the invention has been illustrated in what are considered its best applications it may have other embodiments without departing from its spirit and is not therefore limited to the structures shown in the drawings.

What I claim is:

1. In apparatus of the character as described, the combination with a vehicle having traction means for causing the vehicle to travel along the earth's surface with alternate periods of rest and movement, and carry one or more excavators to different places of excavation, of one or more excavator drills mounted thereon and adapted to be inserted into and withdrawn from the ground, means for rotating said drills and means for inserting and withdrawing said drills into and from the earth and means relating the said traction means and the drill inserting and withdrawing means to insert and withdraw the drills only while they are stationary as regards movement along the ground.

2. In apparatus of the character as described, the combination with a motor driven vehicle having traction means for causing the vehicle to travel along the earth's surface with alternate periods of rest and movement and carry one or more excavators to different places of excavation, of one or more excavator drills mounted thereon and adapted to be inserted into and withdrawn from the ground, means for rotating said drills from the motor of the vehicle and means for inserting and withdrawing said drills into and from the earth and means relating the said traction means and the drill inserting and withdrawing means to insert and withdraw the drills only while they are stationary as regards movement along the ground.

3. In apparatus of the character as described, the combination with a motor driven vehicle having traction means for causing the vehicle to travel along the earth's surface with alternate periods of rest and movement and carry one or more excavators to different places of excavation, of one or more excavator drills mounted thereon and adapted to be inserted into and withdrawn from the ground, means for rotating said drills from the motor of the vehicle and means driven from the motor for inserting and withdrawing said drills into and from the earth and means relating the said traction means and drill inserting and withdrawing means to insert and withdraw the drills only while they are stationary as regards movement along the ground.

4. In apparatus of the character as described, the combination with a vehicle having traction means for causing the vehicle to travel along the earth's surface with alternate periods of rest and movement and carry one or more excavators to different places of excavation, of one or more excavators mounted thereon and adapted to be inserted into and withdrawn from the ground, means for inserting and withdrawing said one or more excavators into and from the earth, means relating the said traction means and the drill inserting and withdrawing means to insert and withdraw the drills while they are stationary as regards movement along the ground, means mounted on the vehicle for supplying filling material to the excavated holes and means carried by the vehicle for tamping the filling material in the holes, the tampers having successively decreasing strokes as the holes are filled.

5. In apparatus of the character as described, the combination with a vehicle adapted to travel along the earth's surface and carry one or more excavators to different places of excavation, a motor on the vehicle and means for intermittently propelling the vehicle by said motor, a gang of excavators mounted on said vehicle and adapted to be inserted into and withdrawn from the ground, means for inserting and withdrawing said one or more excavators into and from the earth during the periods of dwell in the propulsion of said vehicle, means on the vehicle for feeding filling material to the excavated holes, said feeding means having orifices corresponding to the excavated holes for the discharge of the filling materials into the excavated holes, the said discharge orifices during a given period of dwell in the propulsion of the vehicle substantially registering with the holes excavated during a preceding dwell of the vehicle.

6. In apparatus of the character as described, the combination with a vehicle adapted to travel along the earth's surface and carry one or more excavators to different places of excavation, a motor on the vehicle and means for intermittently propelling the vehicle by said motor, a gang of excavators mounted on said vehicle and adapted to be inserted into and withdrawn from the ground, means for inserting and withdrawing said one or more excavators into and from the earth during the periods of dwell in the propulsion of said vehicle, means on the vehicle for feeding filling material to the excavated holes, said feeding means having orifices corresponding to the excavated holes for the discharge of the filling materials into the excavated holes, the said discharge orifices during a given period of dwell in the propulsion of the vehicle substantially registering with the holes excavated during a preceding dwell of the vehicle and tamping means for the filling material operating through said discharge openings.

7. In apparatus of the character as described, the combination with a vehicle adapted to travel along the earth's surface and carry one or more excavating drills to different places of excavation, of one or more excavating drills mounted thereon and adapted to be inserted into and withdrawn from the ground, means for rotating said drills, means for driving said vehicle along the earth's surface, means for producing periods during which the said excavators are stationary with regard to lateral movement along the surface of the ground and means for inserting and withdrawing said excavators into and from the earth while they are stationary as regards said lateral movement, the said inserting means comprising resilient means for forcing the drills into the earth.

8. In apparatus of the character as described, the combination with a vehicle adapted to travel along the earth's surface and carry one or more excavating drills to different places of excavation, of one or more excavating drills mounted thereon and adapted to be inserted into and withdrawn from the ground, means for rotating said drills, means for driving said vehicle along the earth's surface, means for producing periods during which the said excavators are stationary with regard to lateral movement along the surface of the ground and means for inserting and withdrawing said excavators into and from the earth while they are stationary as regards said lateral movement, the said inserting means comprising resilient means individual to each of the drills for forcing the drills into the earth.

9. In a machine of the character described, means to automatically excavate holes in the ground and to simultaneously fill and tamp previously excavated holes, means to successively operate said automatic means in predetermined intermittent periods, a ground plate located relative to said automatic means, said ground plate being adapted to receive the dirt excavated by said automatic means and further means to convey the dirt away from said ground plate, whereby to maintain the excavated ground substantially free of the dirt.

10. In a machine of the character described, means to automatically excavate holes in the ground and to simultaneously fill and tamp previously excavated holes, means to successively operate said automatic means in predetermined intermittent periods, and further means to maintain the excavated ground substantially free of the dirt coming from the holes.

11. In a machine of the character described, means to simultaneously excavate a series of holes successively in predetermined steps, traction wheels for pivotly supporting said means and a limiting stop or stops for determining the height of the excavating means above the ground, the limiting stop being adapted to engage the inner surface of the rim of a traction wheel.

12. In a machine of the character described, comprising a driving mechanism at the rear portion and a drilling mechanism at the front portion of said machine and a set of traction wheels substantially between both sections, said driving mechanism being adapted to rotate said wheels intermittently and to actuate said drilling mechanism for excavating holes in the ground, while the traction wheels are at rest.

13. In a machine of the character described, comprising a driving mechanism at the rear portion and a drilling mechanism at the front portion of said machine and a set of traction wheels substantially between both sections, a ratchet drive on the shaft of said wheels and means operatively associated with said driving and drilling mechanisms, for respectively actuating and controlling the operation of said ratchet drive for rotating said wheels at timed intervals and operating said drilling mechanism to excavate holes in the ground at periods when the traction wheels are at rest.

14. In a machine of the character described, a drilling mechanism for excavating holes in the ground, said mechanism comprising sets of drills and means for rotating, raising and lowering said drills, said rotating means including a sprocket for each drill and a sprocket chain loop for each set of drills, for simultaneously rotating all drills in the same direction.

15. In a machine of the character described, a drilling mechanism for excavating holes in the ground, said mechanism comprising sets of drills and means for rotating, raising and lowering said drills, said rotating means including a sprocket for each drill and a sprocket chain loop for each set of drills, for simultaneously rotating all drills in the same direction, said raising means comprising a plate, operatively associated with said drills and cam-operated mechanisms for periodically elevating said plate with said drills.

16. In a machine of the character described, a drilling mechanism for excavating holes in the ground, said mechanism comprising sets of drills and means for rotating, raising and lowering said drills, said rotating means including a sprocket for each drill and a sprocket chain loop for each set of drills, for simultaneously rotating all drills in the same direction, said lowering means comprising a ball-seated spring mechanism for each drill, for a safe operation of said drills.

17. In a machine of the character described, a drilling mechanism for exacavating holes in the ground, and located in the front section of said machine, said mechanism comprising sets of drills, means to support the weight of said drilling mechanism on the rim or rims of the traction wheels of said machine and further means for operating said drill mechanism at timed intervals.

18. In a machine of the character described, a drilling mechanism for excavating holes in the ground and located in the front section of said machine, said mechanism comprising drills and means for operating said drills; means to support the weight of said drilling mechanism on the rim or rims of the traction wheels of said machine, and further means for elastically lowering each drill during the excavating period and cam-operated means for simultaneously lifting the lowered drills after the excavating period.

WILLIAM H. FULTON.